United States Patent [19]

Kolonia

[11] Patent Number: 4,639,029
[45] Date of Patent: Jan. 27, 1987

[54] TOOL HANDLE

[76] Inventor: Robert A. Kolonia, R.D. 3, Agnes Rd., Box 318, Milford, N.J. 08848

[21] Appl. No.: 764,125

[22] Filed: Aug. 9, 1985

[51] Int. Cl.⁴ .......................... A01B 1/22; B25G 3/34
[52] U.S. Cl. ...................................... 294/57; 403/265
[58] Field of Search ............... 294/49, 54.5, 55, 55.5, 294/57; 16/110 R, 116 R, DIG. 18, DIG. 19, DIG. 24; 76/109, 111, 113; 81/20, 22, 177.1, 489, 492; 172/371, 378, 380, 381; 403/265–269, 244, 263

[56] References Cited

U.S. PATENT DOCUMENTS

| 1,213,136 | 1/1917 | Adams | 294/57 |
| 1,418,683 | 6/1922 | Stevens | 294/57 X |
| 2,458,815 | 1/1949 | Winkler | 403/269 |
| 2,754,863 | 7/1956 | Yearley | 81/20 X |
| 2,917,349 | 12/1959 | Saylor et al. | 403/263 |
| 3,355,226 | 11/1967 | Portz | 403/268 |
| 3,712,659 | 1/1973 | Kneissl | 294/57 |
| 3,767,249 | 10/1973 | Rogers | 294/49 |
| 3,770,033 | 11/1973 | Gavillet et al. | 81/22 |
| 4,165,771 | 8/1979 | Curati | 81/20 |
| 4,280,727 | 7/1981 | Germain | 294/54.5 |

FOREIGN PATENT DOCUMENTS

| 2452232 | 11/1980 | France | 294/57 |
| 910403 | 11/1962 | United Kingdom | 294/57 |
| 1173714 | 12/1969 | United Kingdom | 403/269 |
| 1424565 | 2/1976 | United Kingdom | 294/57 |

Primary Examiner—Johnny D. Cherry
Attorney, Agent, or Firm—Neil F. Markva

[57] ABSTRACT

A tool handle comprises a composite structure including a core member having a molded plastic outer coating over the core member. The molded plastic composite structure has a socket end, an intermediate section and a butt end. The socket end includes a substantially circular outside diameter for insertion into a socket portion of the tool on which the handle fits. The intermediate section is oval-shaped in cross-section along substantially the entire length thereof and has a transition portion connecting the circular socket end to the oval-shaped intermediate cross-section. The oval-shaped cross-section is effective to facilitate handling of the tool when the socket end is inserted into the socket portion of the tool. Particular features of the invention are directed to various specifically shaped core members, socket ends and butt ends. Other specific features of the invention are directed to the manner in which the tool handle is connected in a socket portion of a tool or with a shank portion of a tool. The tool handle of the invention is particularly useful with hand tools such as shovels, spading forks, pitch forks and the like.

36 Claims, 25 Drawing Figures

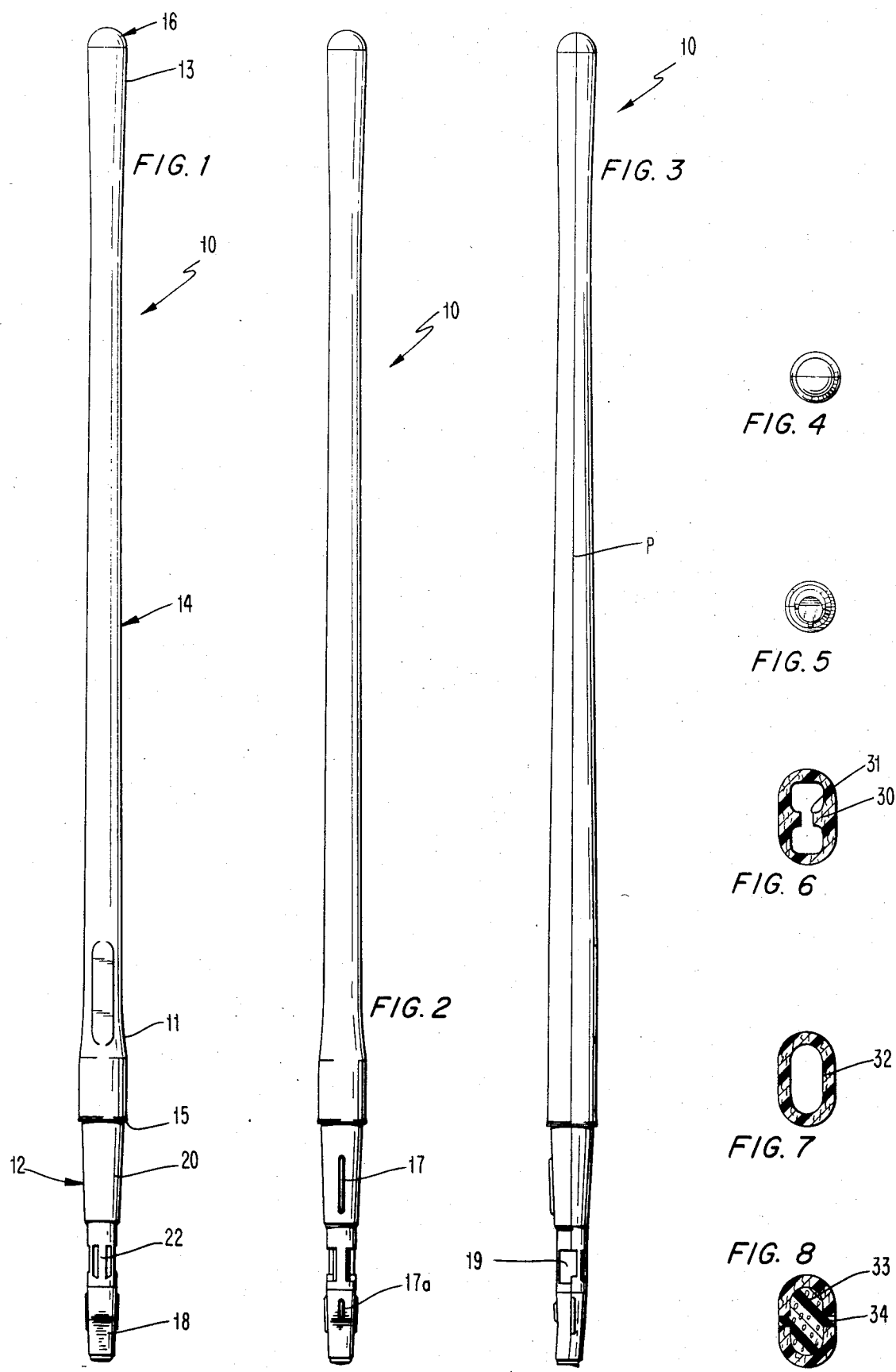

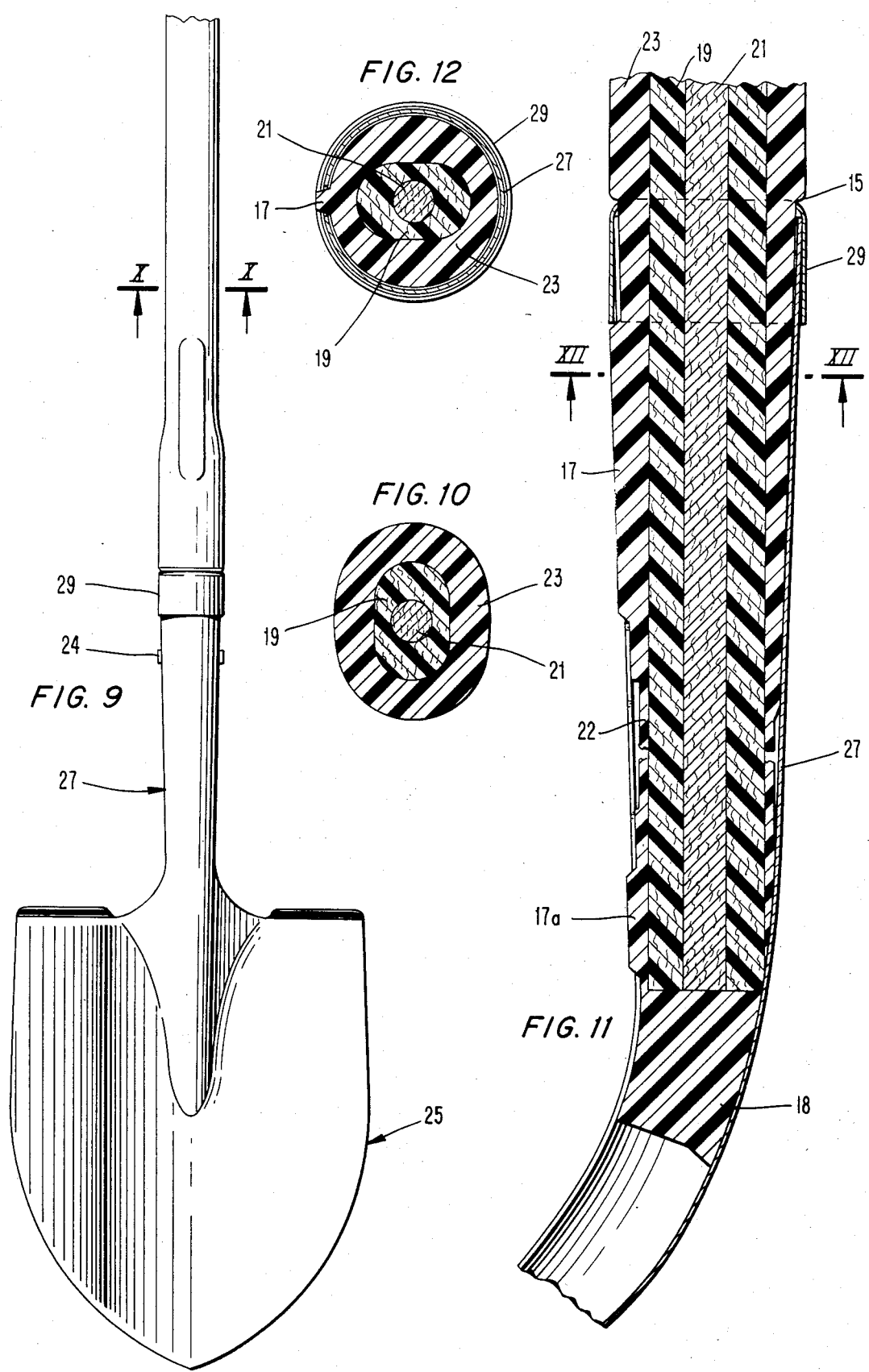

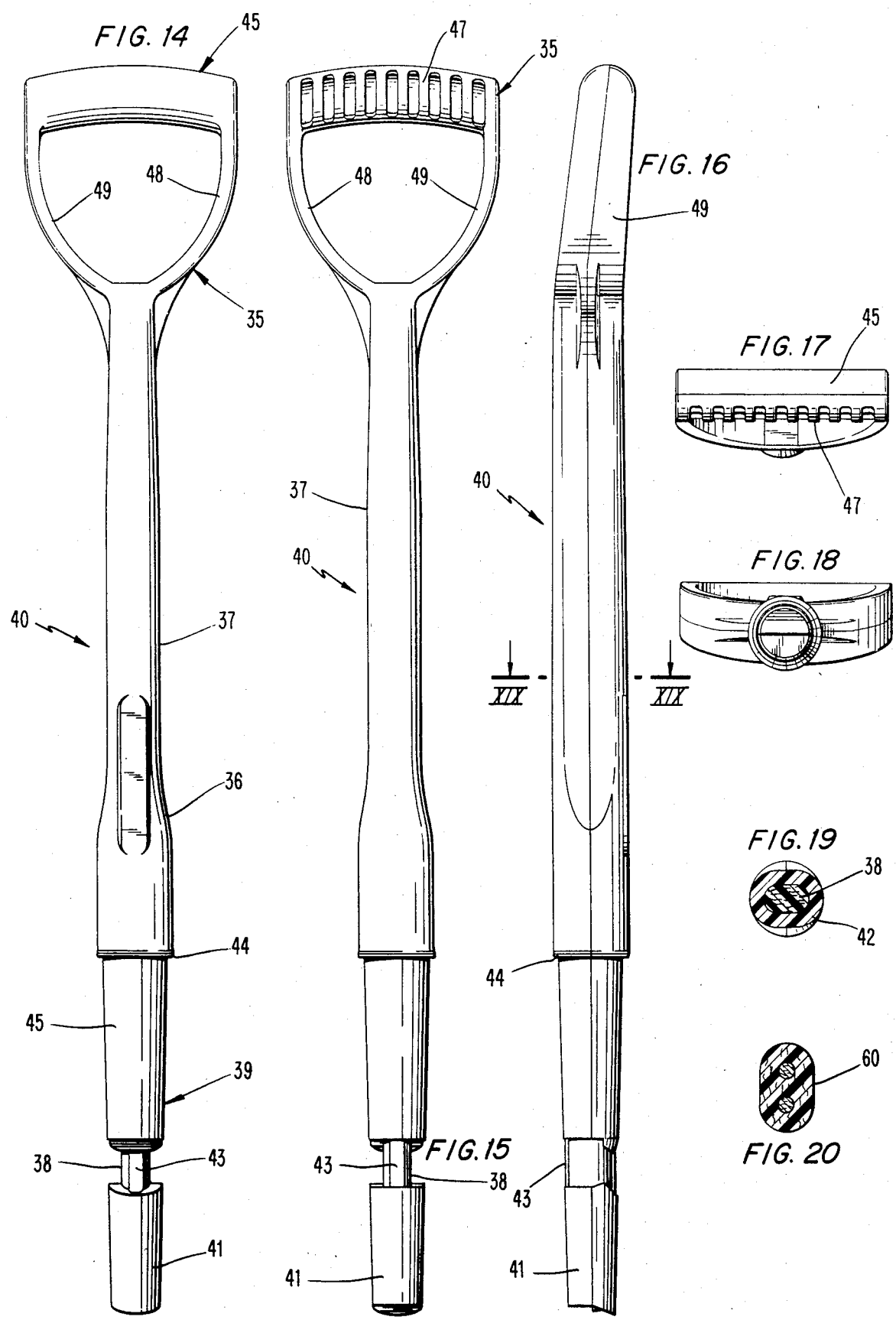

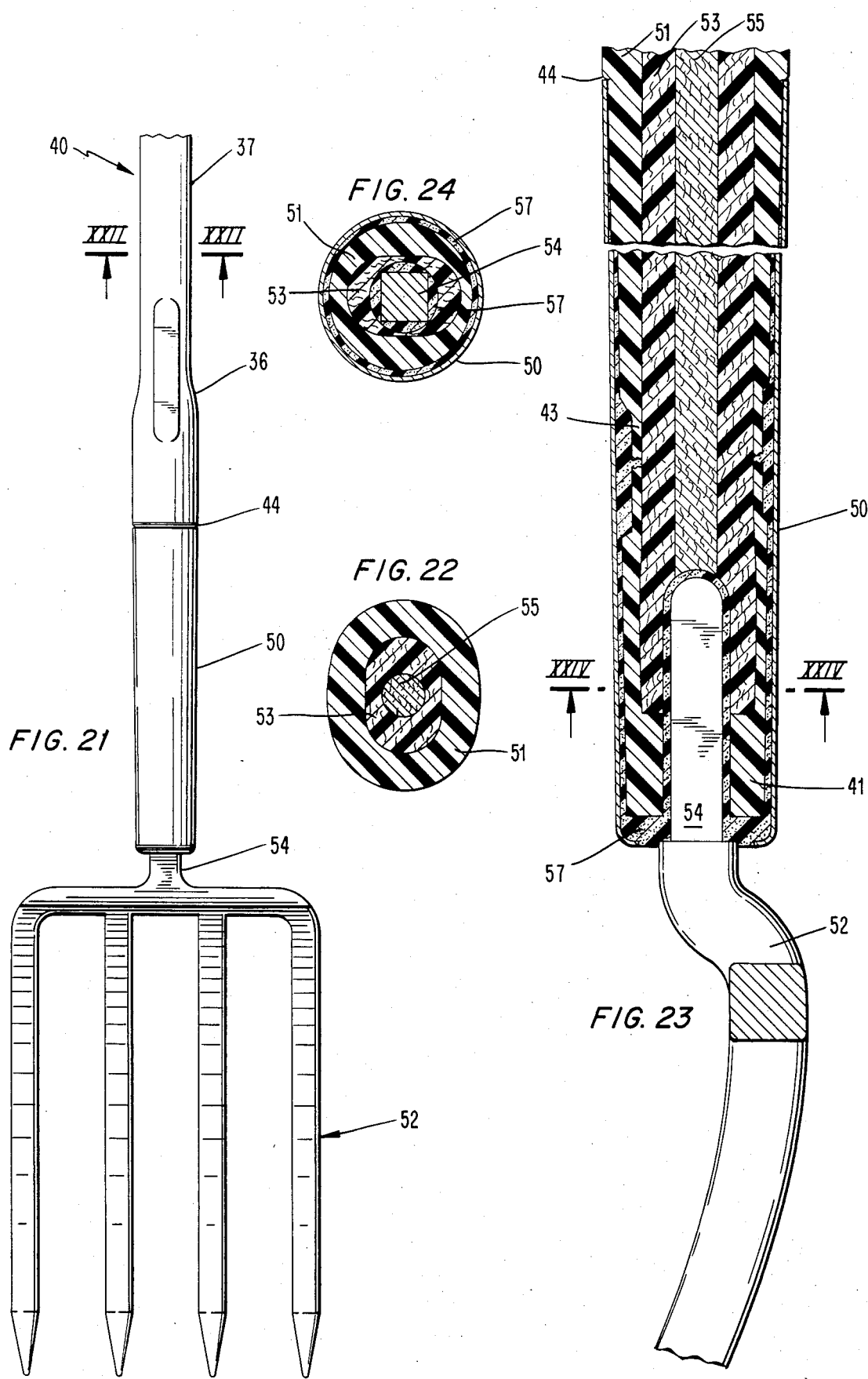

TOOL HANDLE

Field of the Invention

This invention relates to a handle for hand tools such as shovels, spading forks, pitch forks and the like. More particularly, the invention is directed to handles for garden tools composed of a composite plastic structure resulting in an extended life for such handles.

Background of the Invention

The use of molded handles for impact tools having a core member covered with an outer coating is fairly well known. The U.S. Pat. Nos. 2,837,381; 3,712,659; and 3,770,033 typify such known composite handles. While the use of plastic materials to form handles for garden tools such as shovels, spading forks, and pitch forks and the like has been suggested by the prior art, none has ever been produced nor made readily available. Significantly different factors relate to such garden tools than to impact tools. Consequently, the technology as it relates to the production of molded handles for impact tools is significantly different than that associated with garden tools.

First, as is well known, the shape of the opening which receives the tool handle controls the shape of the handle itself. Thus, most impact tools have oval-shaped handles in cross-section. This is due to the generally oval shape of the eye in the tool head.

On the other hand, garden tools generally have wood handles that are circular in cross-section to fit into the circular shanks and sleeves used as part of the garden tool structure. All wooden garden tool handles are easily shaped into a circular cross-section starting with an elongated wood blank having a rectangular cross-section.

While it is known to use plastic as a substitute for wood in tool handles, the production of molded plastic handles for garden tools presents unique problems. The density of high impact, injection molded plastic is much greater than wood. Thus, the weight considerations are very significant particularly because there is a certain flexibility, tensile strength, and impact strength that must be maintained to achieve the desired results. The gripping of a garden handle and its manipulation during use is significantly different from that of an impact tool. All of these factors must be taken into consideration and, until this invention, there has been no practical solution to the unique problems presented in the configuration of a handle for a garden tool.

Once the structure of the handle has been determined, a further problem of how this handle is to be connected to the tool itself presents another problem. When using wood handles, it is simply a matter of driving a pin into the end portion of the wooden handle being secured to the tool such as a shovel having a socket opening or a pick having a connecting shank member. With wood, it is sufficient to securely fix the end of the handle to the garden tool. However, the configuration of the plastic handle in accordance with this invention requires a unique method of coupling to the tool member.

Purpose of the Invention

The primary object of this invention is to provide a plastic handle for a garden tool having a weight substantially equivalent to that of a wood tool handle while providing greater tensile and impact strengths associated with a wider latitude of flexibility.

Another object of the invention is to provide a plastic molded handle for garden tools such as shovels and fork implements which is virtually impossible to break and has a greater facility for gripping and handling during use.

A still further object of the invention is to provide a tool handle having a means for coupling to a garden tool implement such as a shovel or forked instrument so that the handle is particularly adapted to the forces that result from use of such instruments.

Summary of the Invention

The tool handle as described and claimed herein has in one embodiment, a unique composite structure including a core member having a molded plastic outer coating over the core member. The molded plastic composite structure has a socket end, an intermediate section and a butt end.

The socket end includes a circular outside diameter for insertion into a socket portion of a hand tool such as a shovel. The intermediate section is oval-shaped in cross-section along substantially the entire length thereof and has a transition portion connecting the circular socket end to the oval-shaped intermediate cross-section. The oval-shaped intermediate cross-section is effective to facilitate handling of the tool when the socket end is inserted into the tool socket portion.

A particular feature of the present invention is directed to the combination of the tool handle having the composite structure with the hand garden tool which has a working tool end portion and means for coupling the handle to the working tool end portion. The molded plastic composite structure of the handle includes a socket end having an inner, pressure connecting section, an outer tip end section, and runner means extending between the inner connecting section and the outer tip end section. The tool coupling means includes socket means for receiving the socket end of the tool handle and has an inside diameter effective to be forcibly fit over the inner, connecting section to cause the plastic outer coating to be compressed inwardly and rearwardly with respect to the core member. The runner means is frangible so as to be stretched along the core member when the socket end of the handle is forcibly received into the tool socket means. The outer tip end section is effective to withstand compression forces formed where the tip end section is in contact with the inside of the tool socket means. These compression forces are established during the initial procedure for inserting the handle into the tool socket means and are varied due to the amount of leverage that is applied during use of the tool.

Fastener openings are normally included in the tool socket means which is integrally formed as one piece with the working tool end portion. A garden shovel is typical of this type of tool. The coupling means of the present invention includes fasteners having a length sufficient to extend through the fastener openings but a limited distance to penetrate the outer plastic coating without entering into the core member of the composite structure. Thus, the unique connecting mechanism allows the outer coating to move along the core member while maintaining a securely fixed relationship with the tool socket means.

Furthermore, the integrally formed tool socket means includes a handle receiving opening having an outer peripheral edge which fits around the inner, pressure connecting section of the handle. A collar member is disposed over the outer peripheral edge and is effective to act as an inwardly biasing means on the handle connecting section when the socket end of the handle is forcibly received into the tool socket means.

Another feature of the invention is directed to the coupling mechanism when the tool socket means comprises a separately formed sleeve member having openings at each end thereof to be forcibly fit onto the socket of the tool handle. The coupling means in this instance includes a shank member integrally formed as one piece with the working tool end portion such as found in a spading fork. The tool socket end is placed through one sleeve end opening and the tool shank member is received through the other sleeve end opening. The coupling means includes adhesive means disposed within the sleeve member surrounding the socket end of the handle with the tool shank member disposed therein. In a specific embodiment, the outer end tip section of the handle includes a central bore for receiving the tool shank member with the core member including means for receiving the shank member. The adhesive means is initially in a liquid form and hardens after being placed within the sleeve member. Sealing means located adjacent the tool handle receiving end opening of the sleeve member is provided to prevent the adhesive means from leaking out while in the liquid state.

Another feature of the invention is directed to a tool handle having a D-shaped grip end section such as is provided with shortened tool handles. In this instance, the molded plastic structure includes a socket end, a butt end, and an intermediate section having a longitudinal axis. The socket end includes a substantially circular outside diameter for insertion into a socket portion of a tool. The butt end is formed as an integral, one end grip end section with the intermediate section. The grip end section includes a gripping section and two web portions integrally extending from the intermediate section to respective opposed ends of the gripping section. The gripping section includes means enabling the simultaneous molding of the D-shaped grip end section and the molded plastic socket end and intermediate section. In a specific embodiment, the enabling means includes rib members laterally spaced along the longitudinal axis of the gripping section.

Various specific features of the invention are directed to the particular structural configuration of the core member which is oval-shaped and has varying cross-sections inclusive of filler materials. These various core member configurations are discussed hereinbelow. A further feature of the invention is directed to the use of alignment means particularly associated with tool members having integrally formed socket means into which the end of the tool handle fits.

Brief Description of Drawings

Other objects of this invention will appear in the following description and claims, reference being made to the accompanying drawings forming a part of the specification wherein like reference characters designate corresponding parts in the several views.

FIG. 1 is a top plan view of a tool handle made in accordance with this invention;

FIG. 2 is a bottom plan view of the handle shown in FIG. 1;

FIG. 3 is a side elevational view of the tool handle as shown in FIG. 1;

FIG. 4 is a butt end view of the tool handle of FIG. 1;

FIG. 5 is a socket end view of the tool handle of FIG. 1;

FIGS. 6, 7 and 8 are cross-sectional views of core members made in accordance with this invention;

FIG. 9 is a fragmentary top elevational view of a combination of the tool handle of FIG. 1 secured to a shovel;

FIG. 10 is a sectional view along line X—of FIG. 9;

FIG. 11 is a fragmentary sectional view showing the coupling between the tool handle and shovel combination as shown in FIG. 9;

FIG. 12 is a sectional view along line XII—XII of FIG. 11;

FIG. 14 is a top plan view of a D-shaped handle made in accordance with this invention;

FIG. 15 is a bottom plan view of the D-shaped tool handle as shown in FIG. 14;

FIG. 16 is a side elevational view of the handle as shown in FIG. 14;

FIG. 17 is a gripping end view of the handle as shown in FIG. 14;

FIG. 18 is a socket end view of the handle as shown in FIG. 14;

FIG. 19 is a sectional view along line XIX—XIX of the handle as shown in FIG. 16;

FIG. 20 is a cross-sectional view of a core member configuration made in accordance with this invention;

FIG. 21 is a fragmentary top plan view of a hand tool combination including a separately formed sleeve member;

FIG. 22 is a sectional view along line XXII—XXII of FIG. 21;

FIG. 23 is a fragmentary sectional view of the coupling mechanism of the garden tool as shown in FIG. 21;

FIG. 24 is a sectional view along XXIV—XXIV of FIG. 23; and

Detailed Description

Figure 13:
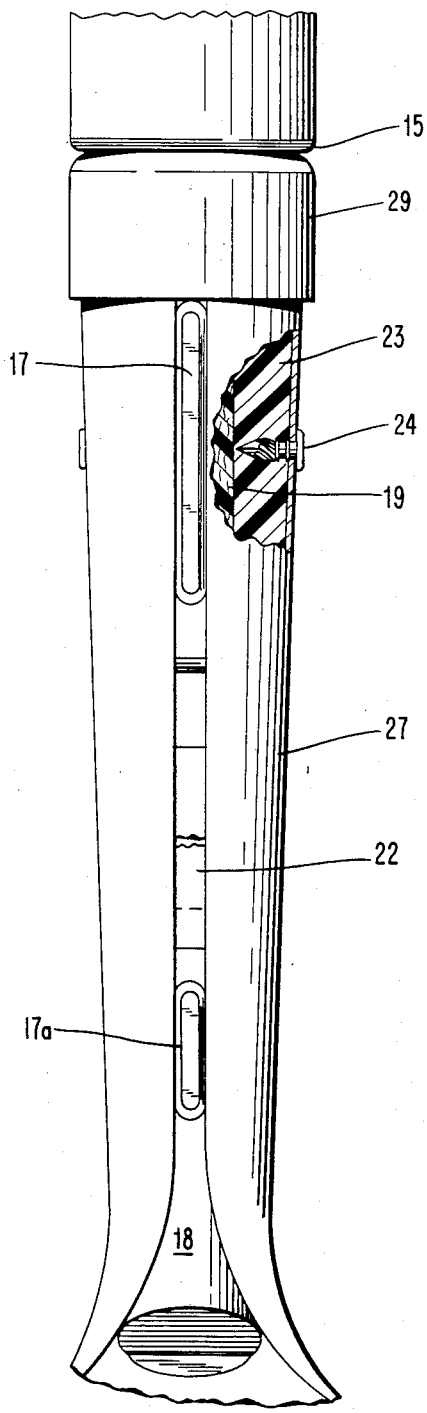
FIG. 13 is a fragmentary bottom plan view of the combination as shown in FIG. 9.

The tool handle, generally designated 10 and shown in FIGS. 1–5, is a molded plastic composite structure having a socket end 12, an intermediate section 14 and a butt end 16. Socket end 12 has a substantially circular outside diameter or cross-section for insertion into a socket portion of a shovel. The intermediate section 14 is oval-shaped in cross-section along substantially entire length thereof and has a transition portion 11 connecting the circular socket end 12 to the oval-shaped intermediate section 14 which is effective to facilitate the handling of the shovel when socket end 12 is inserted into the shovel socket portion as shown in FIG. 9.

The composite structure of handle 10 includes a core member 19 having a molded plastic outer coating 23. The molded plastic outer coating 23 in this particular embodiment is composed of a solid plastic resin, namely, an injected molded thermoplastic resin such as polyethylene or polypropylene.

As shown in FIG. 9, handle 10 is used with a shovel working portion 25 having a socket portion 27 projecting outwardly therefrom with a longitudinal central axis along which handle 10 extends. The core member 19 is hollow and has an oval-shaped cross section with the major axis thereof in a plane extending symmetrically through the longitudinal central axis. As is evident in the drawings, the plane extends through the central point or outer tip 26 of shovel working portion 25. The hollow bore portion of core member 19 is filled with a filler material 21; namely, a paper in the form of a cord having a wax coating thereover.

The butt end 16 of handle 10 has a substantially circular cross-section and the intermediate section 14 has a second transition portion 13 connecting the oval-shaped section 14 to the circular butt end 16. Socket end 12 includes a longitudinally extending key ridge 17 and 17a having a width effective to fit between the edges of the shovel socket 27 in which there is a slot extending the length thereof. See FIG. 13. In this embodiment socket end 12 is tapered inwardly toward the end of the core member and includes an inner, pressure connecting section 20, an outer tip end section 18 and runner means 22 extending between the connecting section 20 and tip end section 18.

Referring specifically to FIG. 11, the outer tip end section 18 is forced into the curved portion of the shovel socket 27 as shown. The end of the core member 19 is substantially in contact with the inside diameter of socket member 27 as shown. The inside diameter of the shovel socket 27 is effective to be forcibly fit over the inner, connecting section 20 to cause the plastic outer coating 23 to be compressed inwardly and rearwardly with respect to core member 19. Runner members 22 are frangible so as to be stretched along core member 19 when the handle socket end 20 is forcibly received into shovel socket 27. The outer tip section 18 is effective to withstand compression forces formed where it is in contact with the inside of shovel socket 27. As shown in FIG. 11, runners 22 are effective to break when handle 10 is forcibly pushed into the tool socket portion 27 to thereby cause the outer coating 23 to move with respect to core member 19 toward butt end 16.

The embodiment as shown in FIG. 9 includes a shovel 25 having a socket portion 27 integrally formed as one piece with the working tool end portion of shovel 25. Fastener openings formed in socket portion 27 are located adjacent the inner, pressure connecting section 20 of handle 10 once it is forcibly fit into shovel socket portion 27. The coupling means includes fasteners 24 having a length sufficient to extend through the fastener openings and a limited distance to penetrate the outer plastic coating 23 without entering into core member 19. Fasteners as shown are standard fasteners extending through openings formed in a standard socket portion 27 of shovel 25.

Further in this embodiment, when the tool socket portion is integrally formed as one piece with the shovel 25 it includes a handle receiving opening having an outer peripheral edge which fits around the inner, pressure connecting section 20 of handle 10. A collar member 29 is disposed over the outer peripheral edge as shown and is effective to act as an inwardly biassing means on handle connecting section 20 when socket end 12 is forcibly received into socket portion 27.

Figure 25:
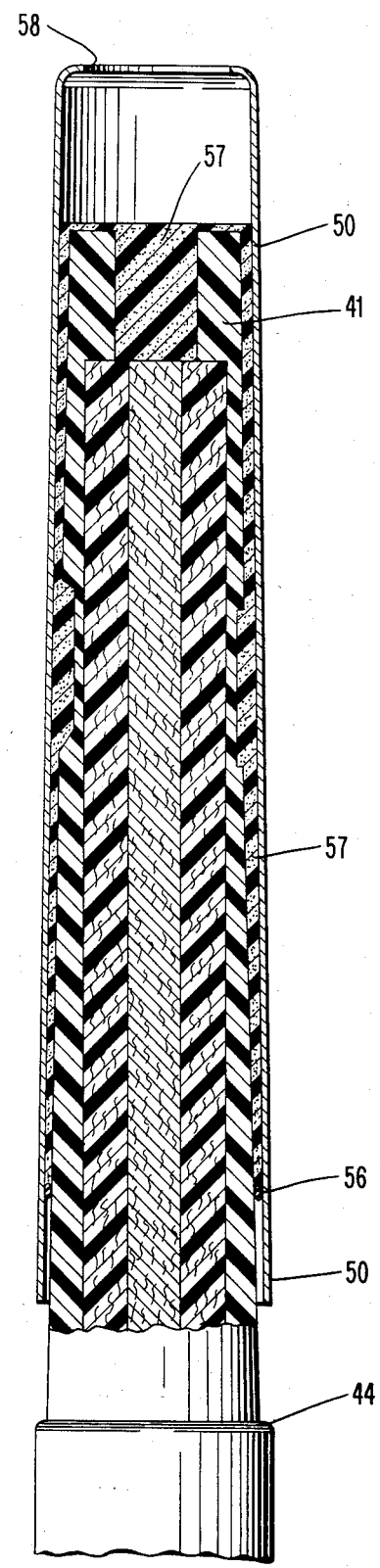
FIG. 25 is a fragmentary sectional view of the coupling mechanism used for the embodiment as shown in FIG. 21 at an intermediate point in the manufacturing process.

Another embodiment of the coupling mechanism for the present invention is shown in FIGS. 21-25. Here, the working tool end portion composed of a spading fork 52 includes a shank member 54 integrally formed as one piece with the fork. The socket means includes a separately formed sleeve member 50 having openings at each end thereof to be forcibly fit onto the socket end of a tool handle 40. The outer tip end section 41 includes a central bore for receiving shank member 54 with the core member 53 including means for receiving shank member 54. See particularly FIG. 23. The handle 40 is held in an inverted position as shown in FIG. 25 and sleeve member 50 is placed thereover. Sealing means in the form of an O-ring 56 is located adjacent the inner, pressure connecting section 45. Adhesive material which is initially in a liquid form is introduced into the opening 58 of sleeve member 50. The sealing O-ring 56 prevents the liquid adhesive material from leaking out while in the liquid state. In this particular embodiment, the adhesive means is an epoxy resin material 57.

After the epoxy resin material 57 has been placed in position as shown in FIG. 25, the shank member 54 of fork 52 is forcibly driven downwardly into the central bore of the tip end section 41 and into the paper bore portion 55 of core member 53. That is, the configuration of core member 53 is effective to be penetrated by shank member 54 when forcibly pushed into the central bore of the tip end section 41. The epoxy resin is allowed to harden and stretched and generally broken runners 53 allow the compression of the outer coating 51 against the shoulder member 44 and outer peripheral edge of the sleeve to pressure fit the entire combination together. The hardened epoxy resin material securely fixes the fork 52 in place.

The D-shaped handle as shown in FIGS. 14-19 constitutes a further embodiment of a handle made in accordance with this invention. Tool handle 40 comprises a molded plastic structure including a socket end 39, a butt end 35 and an intermediate section 37 having a longitudinal axis. Socket end 39 includes a substantially circular outside diameter for insertion into a socket portion of a tool. Butt end 35 is formed as an integral, one piece grip end section with intermediate section 37. Grip end section 35 includes a gripping section 45 and two web portions 48 and 49 integrally extending from the intermediate section 37 to respective opposed ends of the gripping section 45 to form a D-shaped configuration. Gripping section 45 includes means enabling the simultaneous molding of the plastic D-shaped grip end section 35 and the molded plastic socket end 39 and intermediate section 37. The enabling means includes rib members 47 laterally spaced along the longitudinal axis of the gripping section 45. The longitudinal axis is located in a plane which extends substantially perpendicular to the longitudinal axis of intermediate section 37. The molded plastic structure of this embodiment includes a composite structure having a core member 38 with a molded plastic outer coating 42 disposed thereover. The intermediate section 37 is oval-shaped in cross-section along substantially the entire length thereof and has a transition portion 36 connecting the circular socket end 39 to the oval-shaped intermediate section 37. Such intermediate section 37 is effective to facilitate handling of the tool when the socket end 39 is inserted into the tool socket portion. The particular configuration of the runner 43 and core member 38 is substantially the same as that as described with respect to the embodiment as shown in FIGS. 1-5.

The particular configuration of the gripping section 45 with the rib members 47 is necessary to enable the injection molding of the part as well as providing a gripping function during use of the tool. The tip end section 41 is shaped slightly differently than the tip end section 18 to receive the shank member as discussed hereinabove.

It has been found that various types of cross-sectional structures for the core members useful in the present tool handles are very effective in reducing weight and providing the necessary strength with respect to the various tool handles. FIG. 6 shows a hollow core member 30 with an outerwall having a substantial uniform thickness around the entire periphery. A web portion 31 extends inwardly from the inside bore wall of core member 30.

The core member 32 shown in FIG. 7 is totally hollow and again has an outer wall with a substantial uniform thickness around the entire periphery thereof. The core members of the present invention are composed of a strand material encased in a resinous material. More specifically, the strand material is fiberglass.

The core member 34 as shown in FIG. 8 has a substantial uniform wall thickness with at least one solid bore material 33 along the entire length of the core member.

While the core member as shown in the embodiments of the shovel and fork combinations include a single cord of paper, the embodiment of the core member shown in FIG. 20 includes at least two cords of paper extending the entire length of core member 60. While the basic embodiments of this invention include injection molded material, it is possible that the molded plastic material used in the outer coating may be composed of a plastic foam material.

The oval shape of the core members provides the necessary strength and flexibility while decreasing the total amount of weight of the handles made in accordance with this invention. The oval-shaped cross-section provides a unique and efficient manner of gripping the handle during work. Furthermore, the specific configuration of the core member and the outer coating thereover provides flexibility along with tensile and impact strength to result in a virtually unbreakable tool handle.

While the tool handle has been shown and described in detail, it is obvious that this invention is not to be considered as limited to the exact form disclosed, and that changes in detail and construction may be made therein within the scope of the invention without departing from the spirit thereof.

Having thus set forth and disclosed the nature of this invention, what is claimed is:

1. A hand garden tool handle for a garden tool having a working tool end portion, a socket portion projecting outwardly from the working tool end portion and with a longitudinal central axis, and means for coupling the handle to the working tool end portion, said handle comprising:
   (a) a composite structure including a core member having a molded plastic outer coating over the core member;
   (b) the composite structure having a socket end, an intermediate section and a butt end,
   (c) the socket end including a substantially circular cross section for insertion into the socket portion with the outer coating to be disposed between the core member and the socket portion of the garden tool;
   (d) the intermediate section being oval-shaped in cross-section along substantially the entire length thereof and having a transition portion connecting the circular socket end to the oval-shaped section;
   (e) the oval-shaped intermediate cross section with the major axis thereof in a plane to extend symmetrically through the longitudinal central axis of the socket portion when the socket end is disposed in the portion of the tool thereby being effective to facilitate handling of the tool.

2. A handle as defined in claim 1 wherein the molded plastic outer coating is composed of a solid plastic resin.

3. A handle as defined in claim 2 wherein the solid plastic resin is composed of an injected molded thermoplastic resin.

4. A handle as defined in claim 1 wherein the core member is hollow.

5. A handle as defined in claim 1 wherein the core member includes a hollow bore portion filled with a filler material.

6. A handle as defined in claim 5 wherein the filler material is paper.

7. A handle as defined in claim 6 wherein the paper is in the form of a cord having a wax coating thereover.

8. A handle as defined in claim 7 wherein there are at least two cords of paper extending the length of the core member.

9. A handle as defined in claim 5 wherein the filler material is a molded plastic material.

10. A handle as defined in claim 9 wherein the molded plastic material is a plastic foam material.

11. A handle as defined in claim 1 wherein the core member is hollow and has an outer wall with a substantially uniform thickness around the entire periphery of the cross-section thereof, said core member is composed of a strand material encased in a resinous material.

12. A handle as defined in claim 11 wherein the strand material is fiberglass.

13. A handle as defined in claim 1 wherein the core member is hollow defining a bore and has a web portion extending inwardly from the inside bore wall of the core member.

14. A handle as defined in claim 1 wherein there is at least one solid bore material along the entire length of the core member.

15. A handle as defined in claim 1 wherein the butt end has a substantially circular cross-section and the intermediate section has a second transition portion connecting said oval-shaped section to the circular butt end.

16. A handle as defined in claim 1 wherein the socket end includes a longitudinally extending key ridge having a width effective to fit between the edges of a tool socket slot extending the length of the tool socket portion.

17. A handle as defined in claim 1 wherein the socket end is tapered inwardly toward the end of the core member and includes an inner, pressure connecting section, an outer tip end section and runner means formed in the outer coating extending between the inner, connecting section and the outer tip end section.

18. A handle as defined in claim 17 wherein the runner means is effective to break when the handle is forcibly pushed into the socket portion of the tool to thereby cause the outer coating in the pressure connecting section to move with respect to the core member toward the butt end of the tool handle.

19. A handle as defined in claim 1 wherein
the butt end is formed as an integral, one piece grip end section with the intermediate section,
said grip end section includes a gripping section and two web portions integrally extending from the intermediate section to respective opposed ends of the gripping section to form a D-shaped configuration, and
the gripping section includes means enabling the simultaneous molding of the plastic D-shaped grip end section and the molded plastic socket end and intermediate section.

20. A handle as define in claim 19 wherein
the gripping section has a longitudinal axis in a plane which extends substantially perpendicular to the longitudinal axis of the intermediate section,
the enabling means includes rib members laterally spaced along the longitudinal axis of the gripping section.

21. A handle as defined in claim 19 wherein
the intermediate section is oval-shaped in crosssection along substantially the entire length thereof and has a transition portion connecting the circular socket end to the oval-shaped intermediate section,
the oval-shaped intermediate section being effective to facilitate handling of the tool when the socket end is inserted into the socket portion of the tool.

22. A handle as defined in claim 21 wherein
the molded plastic is composed of an injected molded thermoplastic resin.

23. A handle as defined in claim 21 wherein
the molded plastic structure includes a composite structure having a core member with a molded plastic outer coating over the core member,
the core member includes a hollow bore portion filled with a filled material.

24. A handle as defined in claim 21 wherein
the core member has an oval-shaped cross-section with the major axis thereof in a plane extending symmetrically through the longitudinal central axis of the tool.

25. A handle as defined in claim 19 wherein
the socket end is tapered inwardly toward the end of the socket end of the core member and includes an inner, pressure connecting section, an outer tip end section and a runner means extending between the inner, connecting section and the outer tip end section.

26. A handle as defined in claim 25 wherein
the runner means is effective to break when the handle is forcibly pushed into the socket portion of the tool to thereby cause the outer coating in the pressure connecting section to move with respect to the core member toward the butt end of the tool handle.

27. In a hand garden tool having a working tool end portion, a handle, and means for coupling the handle to the working tool end portion, the combination comprising:
(a) a tool handle including a composite structure having a core member with a molded plastic outer coating over the core member;
(b) the composite structure including a socket end having an inner, pressure connecting section, an outer tip end section, and runner means formed in the outer coating extending between the inner connecting section and the outer tip end section;
(c) the coupling means including socket means for receiving the socket end of the tool handle and having an inside diameter effective to be forcibly fit over the inner, connecting section to cause the plastic outer coating to be compressed inwardly and rearwardly with respect to the core member;
said runner means being frangible so as to be stretched along the core member when the socket end of the handle is forcibly received into the socket means;
(e) said outer tip end section being effective to withstand compression forces formed where the tip section is in contact with the inside of the socket means.

28. A handle as defined in claim 27 wherein
the socket means is integrally formed as one piece with the working tool end portion and includes fastener openings at a location that is adjacent the inner, pressure connecting section of the handle when the handle is forcibly fit into the socket means,
said coupling means includes fasteners having a length sufficient to extend through the fastener openings and a limited distance to penetrate the outer plastic coating without entering into the core member.

29. A handle as defined in claim 27 wherein
a socket means is integrally formed as one piece with the working tool end portion and includes a slot extending the entire length thereof,
the socket end of the handle includes alignment means located along the outer surface thereof to follow along the slot of the socket means when the tool handle is forcibly received into the socket means.

30. A handle as defined in claim 27 wherein
the socket means is integrally formed as one piece with the working tool end portion and includes a handle receiving opening having an outer peripheral edge which fits around the inner, pressure connecting section of the handle with a collar member disposed over said outer peripheral edge,
said collar member being effective to act as an inwardly biasing means on the handle connecting section when the socket end of the handle is forcibly received into the socket means.

31. In a shovel having a working tool end portion and socket means integrally formed as one piece with the working tool end portion, a handle, and means for coupling the handle to the working tool end portion, the combination comprising:
(a) a tool handle including a composite structure having a core member with a molded plastic outer coating over the core member;
(b) the composite structure including a socket end having an inner, pressure connecting section, an outer tip end section, and runner means extending between the inner connecting section and the outer tip end section;
(c) the coupling means including socket means for receiving the socket end of the tool handle and having an inside diameter effective to be forcibly fit over the inner, connecting section to cause the plastic outer coating to be compressed inwardly and rearwardly with respect to the core member;
(d) said runner means being frangible so as to be stretched along the core member when the socket end of the handle is forcibly received into the socket means;

(e) said outer tip end section being effective to withstand compression forces formed where the tip end section is in contact with the inside of the socket means;

(f) said socket means includes fastener openings at a location that is adjacent the inner, pressure connecting section of the handle when the handle is forcibly fit into the socket means.

(g) said coupling means includes fasteners having a length sufficient to extend through the fastener openings and a limited distance to penetrate the outer plastic coating without entering into the core member, (h) the socket means includes an outer peripheral edge which fits around the inner, pressure connecting section of the handle with a collar member disposed over said outer peripheral edge, (i) said collar member being effective to act as an inwardly biassing means on the handle connecting section when the socket end of the handle is forcibly received into the socket means.

32. In a hand garden tool having a working tool end portion, a handle, and means for coupling the handle to the working tool end portion, the combination comprising:

(a) a tool handle including a composite structure having a core member with a molded plastic outer coating over the core member;

(b) the composite structure including a socket end having an inner, pressure connecting section, an outer tip end section, and runner means extending between the inner connecting section and the outer tip end section; ·

(c) the coupling means including socket means for receiving the socket end of the tool handle and having an inside diameter effective to be forcibly fit over the inner, connecting section to cause the plastic outer coating to be compressed inwardly and rearwardly with respect to the core member;

(d) said runner means being frangible so as to be stretched along the core member when the socket end of the handle is forcibly received into the socket means;

(e) said outer tip end section being effective to withstand compressing forces formed where the tip end section is in contact with the inside of the socket means;

(f) the coupling means includes a shank member integrally formed as one piece with the working tool end portion; and (g) the socket means comprises a separately formed sleeve member having openings at each end thereof to be forcibly fitted onto the socket end of the tool handle through one sleeve end opening and the shank member of the tool being received through the other sleeve end opening;

(h) said coupling means includes adhesive means within the sleeve member surrounding the socket end of the handle with the shank member disposed therein.

33. A handle as defined in claim 32 wherein
the outer end tip section includes a central bore for receiving the shank member with the core member including means for receiving the shank member.

34. A handle as defined in claim 32 wherein
the adhesive means is initially in a liquid form and hardens after being placed within the sleeve member,
said coupling means includes sealing means located adjacent the tool handle receiving end opening of the sleeve member to prevent the adhesive means from leaking out while in the liquid state.

35. A handle as defined in claim 34 wherein
the adhesive means is an epoxy resin material.

36. A handle as defined in claim 34 wherein
the outer tip end section includes a central bore for receiving the shank member with the core member including means for receiving the shank member,
the core member has a paper bore portion effective to be penetrated by the shank member when forcibly pushed into said central bore of the outer tip end section.

* * * * *